(No Model.)
J. F. PLACE.
ELECTRIC CABLE CONDUCTOR AND SHEAVE WHEEL.
No. 566,697.   Patented Aug. 25, 1896.
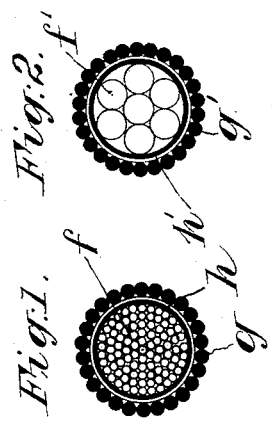
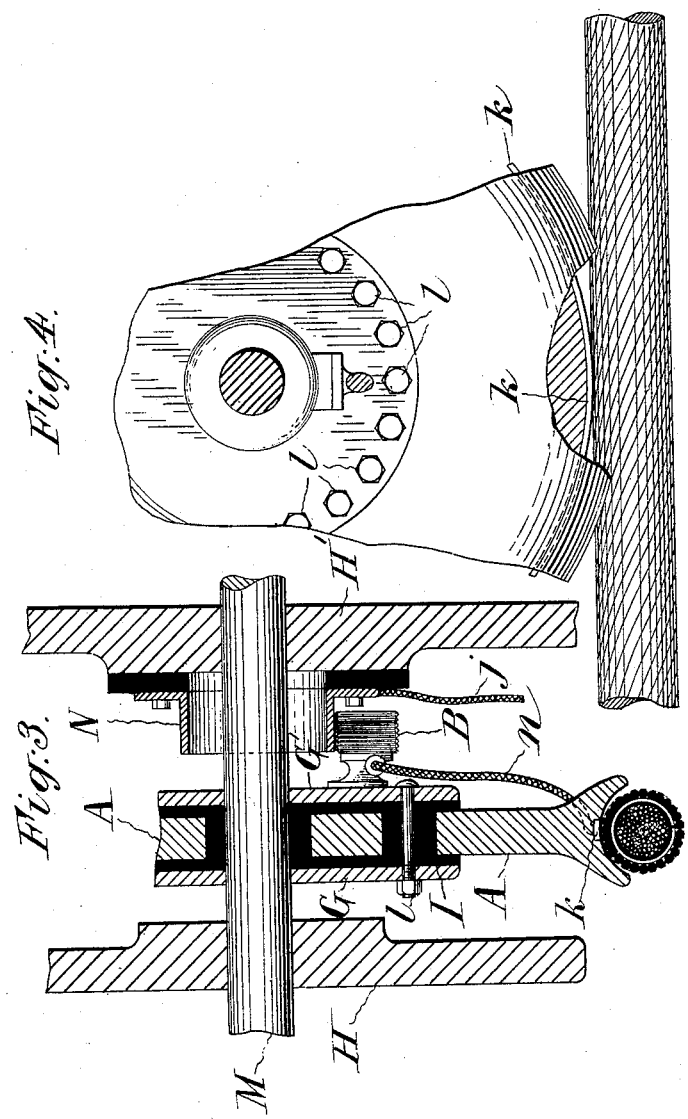
Witnesses:
Inventor
Jas. F. Place

UNITED STATES PATENT OFFICE.

JAMES F. PLACE, OF MONTCLAIR, NEW JERSEY, ASSIGNOR OF ONE-HALF TO CHARLES S. UPTON, OF NEW YORK, N. Y.

ELECTRIC CABLE CONDUCTOR AND SHEAVE-WHEEL.

SPECIFICATION forming part of Letters Patent No. 566,697, dated August 25, 1896.

Application filed April 12, 1894. Serial No. 507,229. (No model.)

*To all whom it may concern:*

Be it known that I, JAMES F. PLACE, a citizen of the United States, residing in Montclair, Essex county, New Jersey, have invented a new and Improved Electric Cable Conductor and Trolley or Motor Sheave for Taking the Electrical Energy from said Conductor, of which the following is a specification.

This invention relates to wire-cable electric conductors for use as trolley-lines for street and other electric railways, for motor cable tracks or supports in electric haulage and telpherage, and to sheaves or grooved wheels or carriers and motors running on such conductors when used as cable-tracks.

The main object of the invention is to secure the maximum strength in a conductor at minimum cost, and at same time retain the highest conductivity for electric current and insure continuous copper contact in taking off such current.

The invention consists in combining copper with steel or iron in making a cable conductor, and sheave-wheels for use in making contact with such a conductor, as hereinafter more fully described and set forth. In thus combining the copper with steel or iron so as to preserve copper contact with the sheave-wheel or have the copper on outside surface of cable I make the core of the cable entirely of steel or iron and the outside strands entirely of copper, with insulating material, such as cotton, silk, and rubber, between. This insulating-ring between the outside copper strands and the steel or iron core is made necessary by the difference in conductivity; otherwise a galvanic action will be set up by the moisture passing from outside to core. In order to insure great flexibility as well as strength, which is one of the objects of the invention, the inside steel or iron core I make of many strands. The outside strands may be made of single wires laid spirally around the insulating-covering or of strands composed of several wires.

In the accompanying drawings, Figure 1 is a sectional view of my new electric conductor, the steel core being shown made of many small wires. Fig. 2 is a similar cross-section, the core being made of only seven steel wires. Fig. 3 is a sectional view of my improved sheave-wheel, shown in place on my improved cable conductor; and Fig. 4 is a side view of said wheel.

Referring to the reference-marks in the drawings in detail, in Fig. 1 the steel or iron wires forming the core of the cable conductor are shown at $f$. $h$ is the insulating-covering, of silk, cotton, or rubber, the same being also shown at $h'$ in Fig. 2. This insulating-covering may be either one or a combination of all three of the materials named or any other non-conducting material. At $g$ in Fig. 1 and $g'$, Fig. 2, I show the series of flexible copper wires forming the outside surface of the cable conductor. These wires are insulated from the core by the covering $h$ and $h'$, Figs. 1 and 2.

In Fig. 3 H H' is the supporting-frame. A A is the rim of the wheel. G and G' are the supporting-flanges. I is the insulating hard rubber or other non-conducting material to insulate the rim from shaft M and flanges G and G'. In the groove of the wheel, which comes in contact with the conductor, I put a copper wire or band $k$, (shown also at $k$ in Fig. 4,) which is connected with the insulated conductor $n$, Fig. 3, which connects with the brush B, which forms a sliding contact with the annular ring N. This ring is stationary and is fixed to but insulated from the frame H'. The brush B is fixed to the flange G' and turns around with the same, but insulated from it in the usual manner.

By making the electric cable conductor in the manner I have detailed, the advantage of the strength of steel or iron is obtained at much less expense than if all copper were used, while the conductivity and flexibility are at the maximum.

Having thus described my invention, what I claim is—

1. In an electric cable conductor the combination of copper with other metal and insulating material, so arranged that the copper forms the outside and the other metal the core or inside of said conductor, with the insulating material as an annular ring between said copper and other metal, substantially as described.

2. In an electric cable conductor the combination of several flexible wires of steel or iron forming the core or center of said conductor, with a series of copper flexible wires forming the entire outside surface of said conductor, and an insulating annular ring of non-conducting material between said series of copper and steel or iron wires, substantially as described.

3. The combination with an electric cable conductor having its outside surface composed of a series of flexible copper wires, and its inside center or core composed of flexible steel or iron wires, with annular ring of non-conducting material between said copper and steel or iron wires, of a grooved sheave-wheel having a copper wire or band in its groove, and an insulated conductor in contact with and leading from said copper wire or band, substantially as described.

In testimony that I claim the foregoing as my invention I have signed my name, in presence of two witnesses, this 7th day of April, 1894.

JAS. F. PLACE.

Witnesses:
M. W. HAWES,
H. J. KEISER.